(12) United States Patent
Tanaka

(10) Patent No.: US 10,384,599 B2
(45) Date of Patent: Aug. 20, 2019

(54) VEHICLE HAVING SOUND CONTROLLER

(71) Applicant: YAMAHA HATSUDOKI KABUSHIKI KAISHA, Iwata-shi, Shizuoka (JP)

(72) Inventor: Sumito Tanaka, Shizuoka (JP)

(73) Assignee: YAMAHA HATSUDOKI KABUSHIKI KAISHA, Shizuoka (JP)

(*) Notice: Subject to any disclaimer, the term of this patent is extended or adjusted under 35 U.S.C. 154(b) by 0 days.

(21) Appl. No.: 16/197,420

(22) Filed: Nov. 21, 2018

(65) Prior Publication Data
US 2019/0176695 A1 Jun. 13, 2019

(30) Foreign Application Priority Data
Dec. 13, 2017 (JP) .................................. 2017-238581

(51) Int. Cl.
*B60Q 5/00* (2006.01)
*B60L 3/12* (2006.01)
*G10K 15/02* (2006.01)

(52) U.S. Cl.
CPC .............. *B60Q 5/008* (2013.01); *B60L 3/12* (2013.01); *G10K 15/02* (2013.01); *B60L 2270/42* (2013.01)

(58) Field of Classification Search
None
See application file for complete search history.

(56) References Cited

U.S. PATENT DOCUMENTS

| 5,635,903 | A | 6/1997 | Koike et al. |
| 6,859,539 | B1* | 2/2005 | Maeda ............... H04R 5/04 381/163 |
| 2012/0130580 | A1* | 5/2012 | Omote ............... B60Q 5/008 701/22 |
| 2013/0216054 | A1 | 8/2013 | Inoue |
| 2015/0117670 | A1 | 4/2015 | Lee |

FOREIGN PATENT DOCUMENTS

| JP | 07-182587 A | 7/1995 |
| JP | 07-302093 A | 11/1995 |
| JP | 10-83187 A | 3/1998 |
| JP | 2008-176169 A | 7/2008 |
| JP | 2008-275743 A | 11/2008 |
| JP | 2013-167851 A | 8/2013 |

* cited by examiner

*Primary Examiner* — Curtis A Kuntz
*Assistant Examiner* — Kenny H Truong
(74) *Attorney, Agent, or Firm* — Keating and Bennett, LLP (57) ABSTRACT

A vehicle includes an accelerator sensor that detects an amount of operation of an accelerator; a vehicle status sensor that detects a vehicle status; an engine controller that controls an internal combustion engine based on a signal from the accelerator sensor and a signal from the vehicle status sensor; a sound controller that generates an engine sound based on the amount of operation of the accelerator and the vehicle status; and a speaker that is communicably connected to the sound controller and outputs the engine sound. The sound controller includes an engine sound controller that sets a volume of the engine sound to a value that is greater than zero when the amount of operation of the accelerator is zero and the vehicle status is a predetermined status.

9 Claims, 9 Drawing Sheets

VEHICLE HAVING SOUND CONTROLLER

CROSS REFERENCE TO RELATED APPLICATIONS

This application claims the benefit of priority to Japanese Patent Application No. 2017-238581 filed on Dec. 13, 2017. The entire contents of this application are hereby incorporated herein by reference.

BACKGROUND OF THE INVENTION

1. Field of the Invention

The present invention relates to a vehicle including a sound controller.

2. Description of the Related Art

A vehicle including an internal combustion engine (hereinafter simply as an "engine") is driven while the driver listens to the engine sound. With noise regulations strengthened in recent years, engine noise has been reduced. With the reduction of engine noise, the level of an engine sound that is heard by the driver has become lower than before. As a result, the driver may have a strange feeling because the driver does not hear an engine sound that matches the accelerator operation.

Conventional vehicles are known in the art that output a recorded engine sound or an artificially produced engine sound in accordance with the amount of operation of the accelerator. For example, Japanese Laid-Open Patent Publication No. 2008-275743 discloses such a vehicle. Such a vehicle outputs a loud engine sound from the speaker when the driver increases the amount of operation of the accelerator to accelerate, for example. The driver recognizes this engine sound as the engine acceleration sound. The driver hears an engine sound of such a level that matches the amount of operation of the accelerator, and can therefore drive the vehicle without having a strange feeling.

Figure 14:
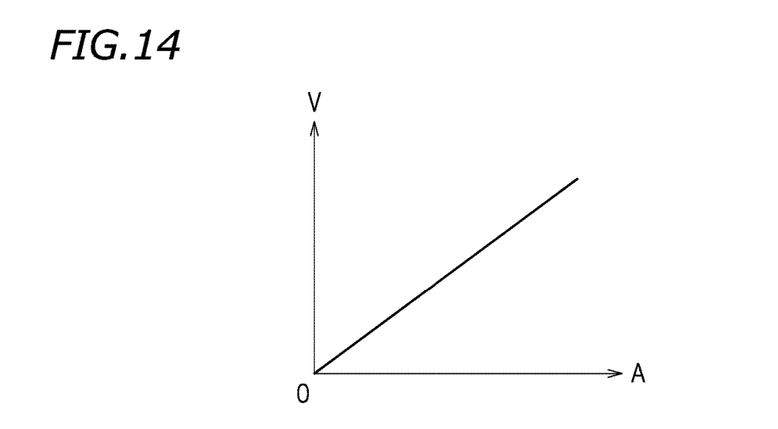
FIG. 14 is a graph showing a relationship between the amount of accelerator operation and the volume of the engine sound according to a conventional sound control.

FIG. 14 is a graph showing an example of a relationship between the amount of operation of the accelerator A (hereinafter "amount of accelerator operation") and the volume V of the engine sound output from the speaker. With the conventional vehicle, the volume V is set to increase as the amount of accelerator operation A increases. The volume V is set to be zero when the amount of accelerator operation A is zero.

For example, when decelerating an automatic transmission vehicle, the driver lowers the amount of accelerator operation to zero, and the engine controller may use blipping. Blipping is to temporarily increase the engine speed while disengaging the clutch. During a blip, there is an engine acceleration sound. With the conventional vehicle, however, the volume V of the engine sound is zero since the amount of accelerator operation A is zero. Therefore, with a vehicle with reduced engine noise, the driver fails to hear an engine sound of a sufficient sound volume at the time of a blip, and the driver therefore has a strange feeling.

Note that the time when the driver has a strange feeling as described above is not limited to the time of a blip. As described above, with conventional vehicles that output an engine sound from a speaker, the driver may have a strange feeling when the amount of accelerator operation is brought to zero.

SUMMARY OF THE INVENTION

Preferred embodiments of the present invention provide vehicles each including a sound controller configured or programmed to generate an engine sound and output the engine sound from a speaker, wherein the driver is unlikely to have a strange feeling when the amount of accelerator operation is brought to zero.

A vehicle according to a preferred embodiment of the present invention includes an internal combustion engine; a driving wheel that is linked to the internal combustion engine; an accelerator that is operated by a driver; an accelerator sensor that detects an amount of operation of the accelerator; a vehicle status sensor that detects a vehicle status; an engine controller that is connected to the accelerator sensor and the vehicle status sensor and configured or programmed to control the internal combustion engine based on a signal from the accelerator sensor and a signal from the vehicle status sensor; a sound controller that is connected to the accelerator sensor and the vehicle status sensor, or is connected at least to the engine controller, and configured or programmed to generate an engine sound based on the amount of operation of the accelerator detected by the accelerator sensor and the vehicle status detected by the vehicle status sensor; and a speaker that is communicably connected to the sound controller and outputs the engine sound. The sound controller includes an engine sound controller that is configured or programmed to set a volume of the engine sound to a value that is greater than zero when the amount of operation of the accelerator detected by the accelerator sensor is zero and the vehicle status detected by the vehicle status sensor is a predetermined status.

With the vehicle described above, while the vehicle status is a predetermined status, the engine sound controller sets the volume of the engine sound to a value that is greater than zero even if the amount of operation of the accelerator is zero. Therefore, even if the amount of operation of the accelerator is zero, an engine sound is output from the speaker. Thus, the driver is able to hear the engine sound output from the speaker and is therefore less likely to have a strange feeling.

The sound controller may include a storage that stores data of a first sound volume that is determined in accordance with the amount of operation of the accelerator detected by the accelerator sensor, and data of a second sound volume that is determined in accordance with the vehicle status detected by the vehicle status sensor. The first sound volume is set to a sound volume that is greater than zero when the amount of operation of the accelerator detected by the accelerator sensor is zero. The engine sound controller may use, as the sound volume of the engine sound, a sound volume that is obtained by multiplying at least the first sound volume and the second sound volume.

There is no particular limitation on the vehicle status. The internal combustion engine includes a throttle valve; and the vehicle status detected by the vehicle status sensor may be at least one of an opening of the throttle valve, an opening ratio of the throttle valve, a rate of change in the opening of the throttle valve, a rate of change in the opening ratio of the throttle valve, a rotation speed of the internal combustion engine, a torque of the internal combustion engine, a load of the internal combustion engine, a rate of change in the load of the internal combustion engine, a running speed of the vehicle, and an acceleration of the vehicle.

The internal combustion engine includes a fuel injector; and the vehicle status detected by the vehicle status sensor may be at least one of a fuel injection amount of the fuel injector, a rotation speed of the internal combustion engine, a torque of the internal combustion engine, a load of the internal combustion engine, a rate of change in the load of the internal combustion engine, a running speed of the vehicle, and an acceleration of the vehicle.

The engine controller may include a blip signal transmitter that transmits a blip signal indicating that blipping is being used. When the blip signal is received from the blip signal transmitter, the engine sound controller is preferably configured or programmed to temporarily increase the volume of the engine sound even if the amount of operation of the accelerator detected by the accelerator sensor is zero.

The vehicle may include a shift operator that is operated by the driver; and a gearshift sensor that detects a position of the shift operator. Upon receiving a signal from the gearshift sensor and detecting a downshift, the engine sound controller is preferably configured or programmed to temporarily increase the volume of the engine sound even if the amount of operation of the accelerator detected by the accelerator sensor is zero.

The vehicle status detected by the vehicle status sensor may be a running speed of the vehicle. When the running speed detected by the vehicle status sensor is greater than zero and is decreasing, the engine sound controller is preferably configured or programmed to set the volume of the engine sound to a value that is greater than zero even if the amount of operation of the accelerator detected by the accelerator sensor is zero.

The vehicle may include a cruise control switch that is operated by the driver and transmits a cruise control signal that instructs a cruise control mode of the internal combustion engine. Upon receiving the cruise control signal from the cruise control switch, the engine sound controller is preferably configured or programmed to set the volume of the engine sound to a value that is greater than zero even if the amount of operation of the accelerator detected by the accelerator sensor is zero.

The vehicle status detected by the vehicle status sensor may be a running speed of the vehicle. The sound controller may include a no-sound controller that is configured or programmed to set the volume of the engine sound to zero when the internal combustion engine is in operation, the amount of operation of the accelerator detected by the accelerator sensor is zero, and the running speed detected by the vehicle status sensor is zero.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
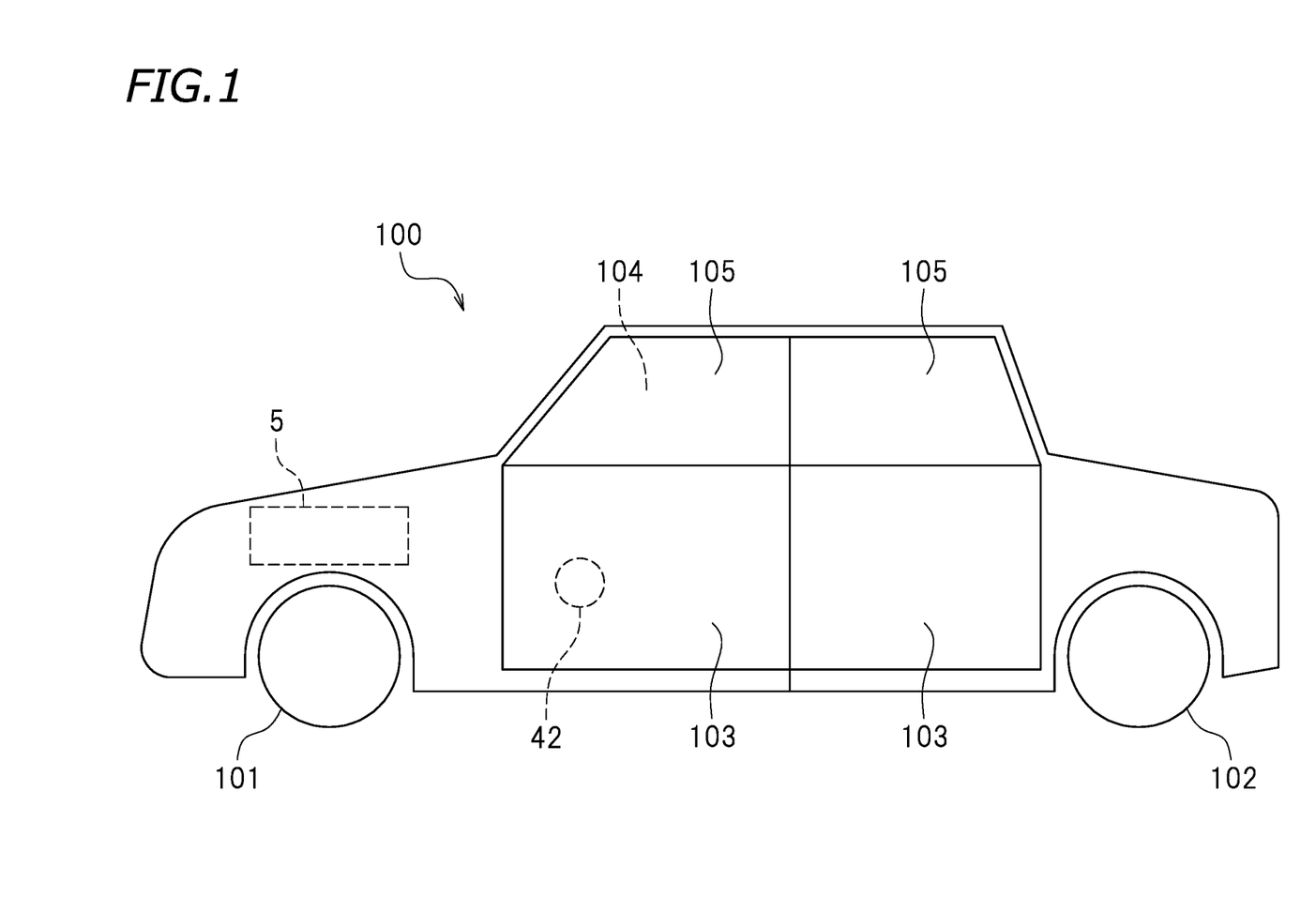
FIG. 1 is a schematic side view showing an automobile according to a preferred embodiment of the present invention.

Preferred embodiments of the present invention will now be described with reference to the drawings. FIG. 1 schematically represents a passenger automobile (hereinafter referred to simply as an "automobile") 100 as an example of a vehicle according to a preferred embodiment of the present invention. The automobile 100 includes an internal combustion engine (hereinafter referred to simply as an "engine") 5 as the driving source, left and right front wheels 101 as driving wheels linked to the engine 5, and left and right rear wheels 102. The automobile 100 includes left and right doors 103. A driver cabin 104 is provided inside the doors 103. The driver cabin 104 is partitioned from the outside by the doors 103 and windows 105.

Figure 2:
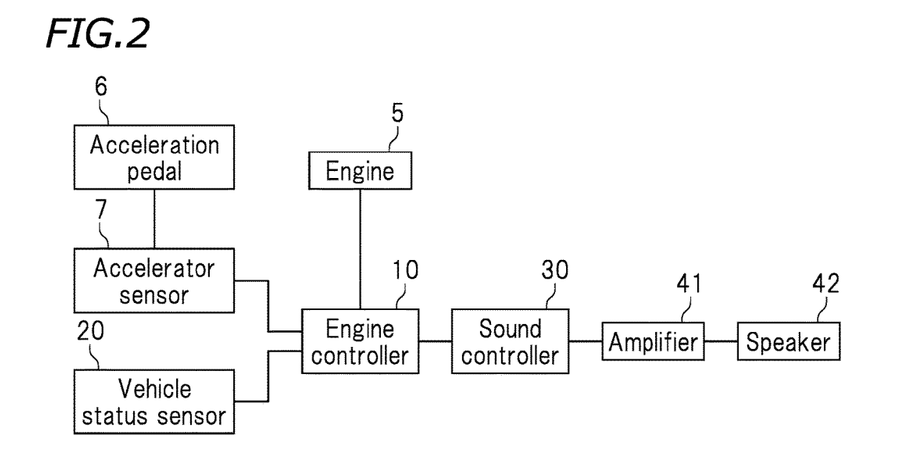
FIG. 2 is a block diagram showing a control system that performs a sound control of the automobile.

As shown in FIG. 2, the automobile 100 includes an acceleration pedal 6. The acceleration pedal 6 is an example of the accelerator operated by the driver. The driver is able to adjust the output of the engine 5 by operating the acceleration pedal 6. The automobile 100 also includes an accelerator sensor 7 that detects the amount of operation of the acceleration pedal 6 (hereinafter, referred to as the "amount of accelerator operation"), and one or more vehicle status sensors 20 that detect the vehicle status. The amount of accelerator operation is a parameter that uniquely represents the status of the acceleration pedal 6, and may be an accelerator opening ratio, an accelerator opening, or the like, for example. Note that the accelerator opening ratio refers to the ratio of the opening of the accelerator with respect to the maximum opening thereof. The vehicle status is a parameter that uniquely represents the status of the vehicle. Specific examples of the vehicle status and the vehicle status sensors 20 will be described below.

The automobile 100 includes an engine controller 10 including an ECU (Electric Control Unit). The engine controller 10 is able to communicate with the accelerator sensor 7 and the vehicle status sensor 20 via a wired or wireless connection. The engine controller 10 is configured or programmed to control the engine 5 by receiving signals from the accelerator sensor 7 and the vehicle status sensor 20. The engine 5 includes a fuel injector 25A and a throttle valve 23A (see FIG. 3). The throttle valve 23A is a valve located along the intake passage (not shown). The engine controller 10 is configured or programmed to control the output of the engine 5 by controlling the fuel injector 25A and the throttle valve 23A.

The automobile 100 may be a so-called automatic transmission vehicle, for example. When the gearshift is in the drive position, the automobile 100 is in an automatic transmission mode in which gears are shifted automatically. The engine controller 10 blips when shifting gears. For example, when shifting down, the engine controller 10 temporarily increases the engine speed while disengaging the clutch (not shown).

The automobile 100 also includes a sound controller 30 including an ECU. The sound controller 30 is able to communicate with the engine controller 10 via a wired or wireless connection. The sound controller 30 is configured or programmed to communicate with the engine controller 10 via a CAN (Controller Area Network) connection. The sound controller 30 is indirectly connected to the accelerator sensor 7 and the vehicle status sensor 20 via the engine controller 10. Note, however, that the sound controller 30 may be directly connected to one or both of the accelerator sensor 7 and the vehicle status sensor 20. The sound controller 30 is further connected to a speaker 42 via an amplifier 41.

Figure 3:
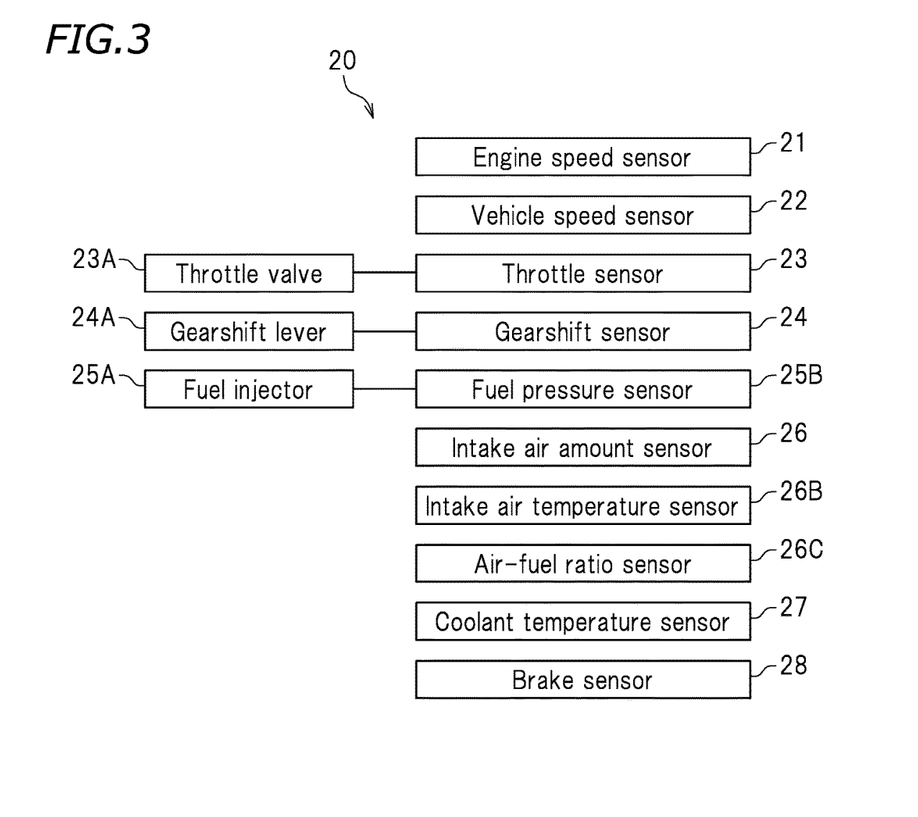
FIG. 3 is a block diagram showing an example of a vehicle status sensor.

FIG. 3 shows specific examples of the vehicle status sensor 20. In a preferred embodiment of the present invention, as the vehicle status sensor 20, the automobile 100 includes an engine speed sensor 21 that detects the rotation speed of the engine 5, a vehicle speed sensor 22 that detects the speed of the automobile 100, a throttle sensor 23 that detects the amount of operation of the throttle valve 23A of the engine 5, a gearshift sensor 24 that detects the position of a gearshift lever 24A, which is an example of the shift operator operated by the driver, a fuel pressure sensor 25B that detects the pressure of the fuel injected from the fuel injector 25A, an intake air amount sensor 26 that detects the amount of intake air of the engine 5, an intake air temperature sensor 26B that detects the temperature of the intake air of the engine 5, an air-fuel ratio sensor 26C that detects the air-fuel ratio of the intake air of the engine 5, a coolant temperature sensor 27 that detects the temperature of the coolant of the engine 5, and a brake sensor 28 that detects the amount of operation of the brake (not shown). Note that the fuel injector 25A is controlled by the engine controller 10 so as to inject a predetermined amount of fuel. The engine controller 10 also is configured or programmed to define and function as a fuel injection amount sensor that detects the fuel injection amount. Thus, the automobile 100 also includes a fuel injection amount sensor. Note that the sensors listed herein are merely illustrative. The automobile 100 may not include one or two or more of the sensors listed above. The automobile 100 may include sensors other than the sensors 21 to 28 as the vehicle status sensor 20.

Figure 4:
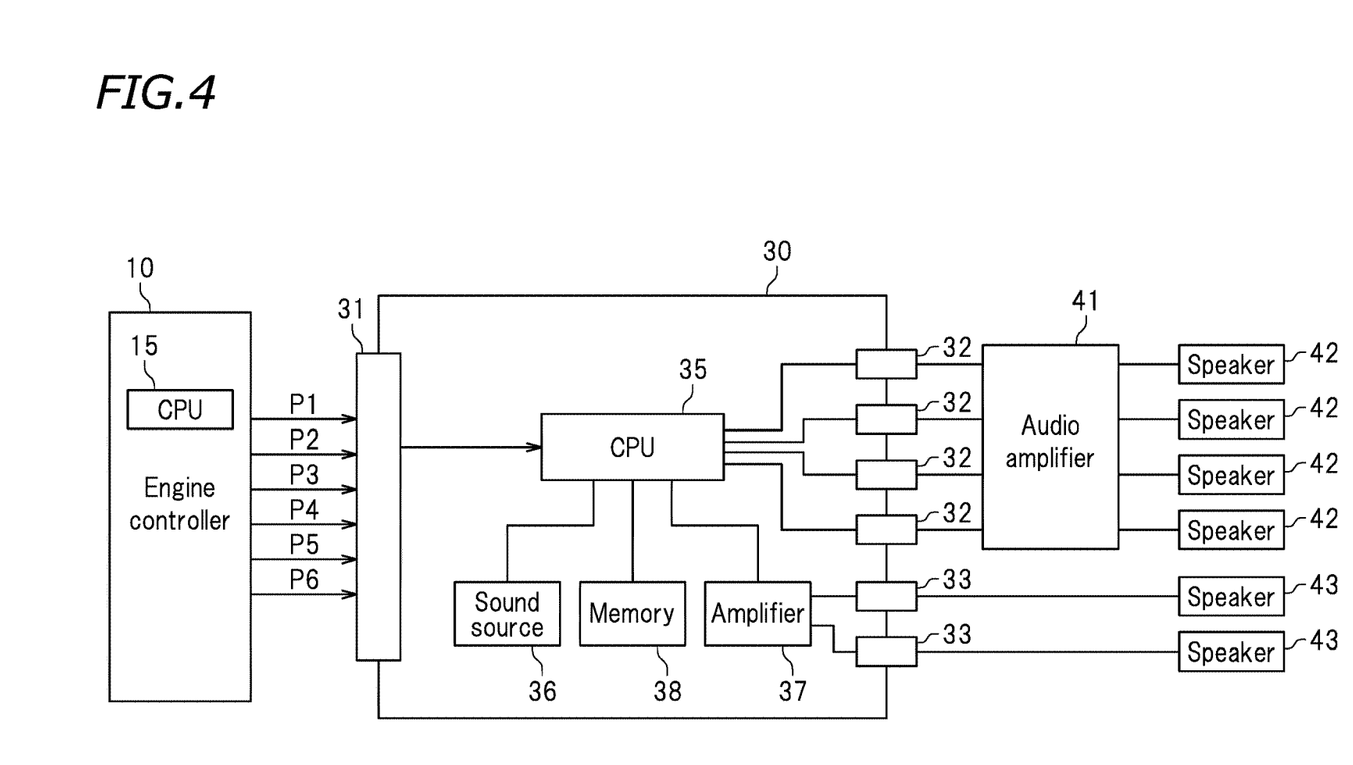
FIG. 4 is a block diagram showing a portion of the control system.

The engine controller 10 receives signals from the accelerator sensor 7 and the vehicle status sensor 20 (specifically, the sensors 21 to 28) to obtain and generate various information that are needed to control the engine 5. The sound controller 30 receives signals from the engine controller 10 to obtain various information. For example, as shown in FIG. 4, the sound controller 30 receives, from the engine controller 10, signal P1 regarding the engine speed, signal P2 regarding the amount of accelerator operation, signal P3 regarding the vehicle speed, signal P4 regarding the gearshift position, signal P5 regarding the amount of operation of the throttle valve, and signal P6 regarding blipping.

The sound controller 30 includes a CPU 35, a sound source 36, a memory 38, an input interface 31, and output interfaces 32. The input interface 31 is able to communicate with the output interface (not shown) of the engine controller 10 via a connection. The automobile 100 includes an audio amplifier 41, and general-purpose speakers 42 connected to the audio amplifier 41. Although not shown in the figure, the audio amplifier 41 is connected to audio devices such as a radio and a music player. The speaker 42 is a speaker installed inside the driver cabin 104 of the automobile 100. For example, the speaker 42 is a door speaker provided on the door 103 of the automobile 100 (see FIG. 1). Note, however, that the location of the speaker 42 is not limited to the door 103. The output interfaces 32 are connected to the audio amplifier 41.

Note that the automobile 100 may include dedicated speakers 43 for the sound controller 30. The sound controller 30 includes an amplifier 37, and the dedicated speakers 43 may be connected to output interfaces 33 connected to the amplifier 37. The automobile 100 may include one or both of the general-purpose speaker 42 and the dedicated speakers 43. There is no limitation on the number and arrangement of the general-purpose speakers 42 and the dedicated speakers 43. Note, however, that it is assumed in the description below that the automobile 100 includes the general-purpose speakers 42 and does not include the dedicated speakers 43.

A recorded engine sound and/or a computer generated engine sound are stored in the sound source 36. The CPU 35 outputs an engine sound stored in the sound source 36 from the speaker 42. The CPU 35 controls the volume of the engine sound output from the speaker 42. The CPU 35 is an example of the engine sound controller of the sound controller 30. The memory 38 stores therein data of a first sound volume that is determined in accordance with the amount of accelerator operation detected by the accelerator sensor 7, and data of the second sound volume that is determined in accordance with the vehicle status detected by the vehicle status sensor 20. Herein, the CPU 35 is configured or programmed so that the volume of the engine sound output from the speaker 42 is at least a sound volume obtained by multiplying together the first sound volume and the second sound volume.

Figure 5:
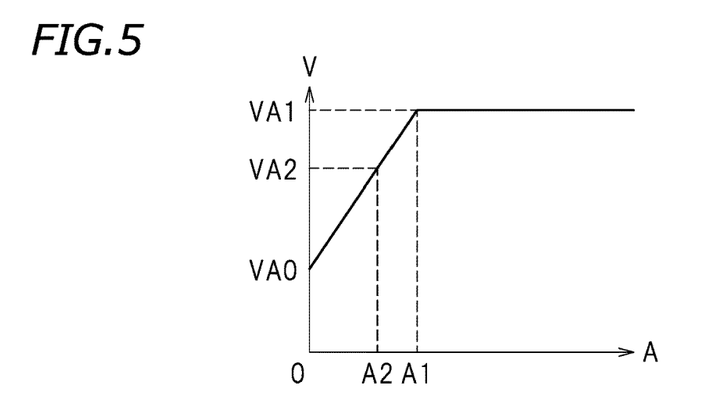
FIG. 5 is a graph showing an example of data of a first sound volume.

FIG. 5 is a graph showing an example of data of the first sound volume. The horizontal axis of the graph of FIG. 5 represents the accelerator opening ratio A, and the vertical axis represents the sound volume V. Note that the accelerator opening ratio A refers to the ratio of the opening of the accelerator with respect to the maximum opening thereof as described above, and represents the ratio of the amount of step-down on the acceleration pedal 6 with respect to the maximum amount of step-down. In this example, the sound volume V is VA0 when the accelerator opening ratio A is zero. Herein, VA0 is a value greater than zero. When the accelerator opening ratio A is greater than zero and less than A1, the greater the accelerator opening ratio A, the greater the sound volume V. When the accelerator opening ratio A is greater than or equal to A1, the sound volume V is at a constant value VA1.

Figure 6:
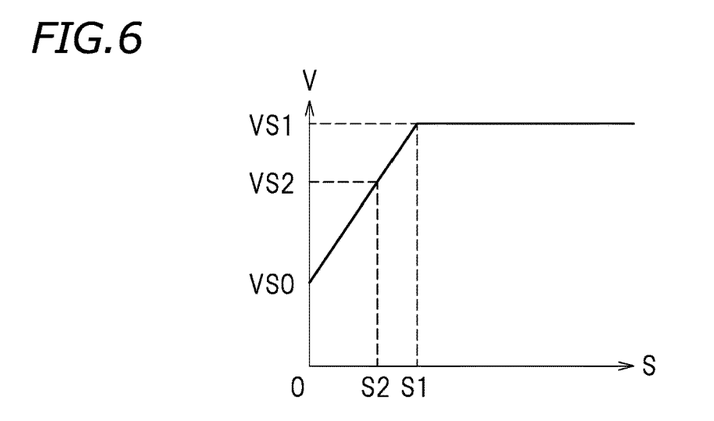
FIG. 6 is a graph showing an example of data of a second sound volume.

FIG. 6 is a graph showing an example of data of the second sound volume. The horizontal axis of the graph of FIG. 6 represents the throttle opening ratio S, and the vertical axis thereof represents the sound volume V. Note that the throttle opening ratio S represents the ratio of the opening of the throttle valve 23A with respect to the maximum opening thereof, and is an example of the amount of operation of the throttle valve 23A. In this example, when the throttle opening ratio S is zero, the sound volume V is VS0, which is greater than zero. When the throttle opening ratio S is greater than zero and less than S1, the greater the throttle opening ratio S, the greater the sound volume V. When the throttle opening ratio S is greater than or equal to S1, the sound volume V is at a constant value VS1.

Figure 7:
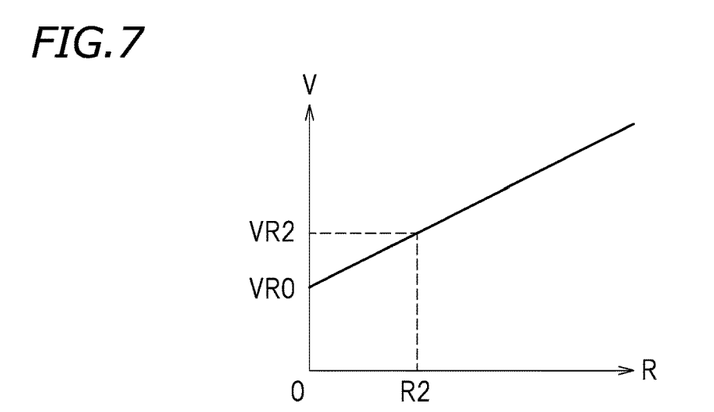
FIG. 7 is a graph showing an example of data of a further second sound volume.

In a preferred embodiment of the present invention, the memory 38 also stores data of a further second sound volume. Note that data of the further second sound volume refers to data of the sound volume determined in accordance with the vehicle status detected by the vehicle status sensor 20, and is data different from the data of the above-described second sound volume (see FIG. 6). FIG. 7 is a graph showing an example of data of the further second sound volume. The horizontal axis of the graph of FIG. 7 represents the engine speed R, and the vertical axis thereof represents the sound volume V. In this example, while the engine speed R is zero, the sound volume V is VR0, which is greater than zero. The greater the engine speed R, the greater the sound volume V.

In a preferred embodiment of the present invention, the CPU 35 uses, as the volume of the engine sound, a sound volume that is obtained by multiplying together the first sound volume and the two second sound volumes. That is, the CPU 35 refers to data of the first sound volume (see FIG. 5) stored in the memory 38, and determines the first sound volume based on the accelerator opening ratio A detected by the accelerator sensor 7. The CPU 35 refers to the data of the second sound volume (see FIG. 6) stored in the memory 38, and determines the second sound volume based on the throttle opening ratio S detected by the throttle sensor 23. The CPU 35 refers to data of the further second sound volume (see FIG. 7) stored in the memory 38, and determines the further second sound volume based on the engine speed R detected by the engine speed sensor 21. Then, the CPU 35 uses, as the volume of the engine sound to be output from the speaker 42, a sound volume that is obtained by multiplying together the first sound volume, the second sound volume, and the further second sound volume. For example, when the accelerator opening ratio A is A2, the throttle opening ratio S is S2, and the engine speed R is R2, the CPU 35 determines the volume of the engine sound to be output from the speaker 42 to be V=VA2×VS2×VR2.

Note, however, that the CPU 35 may use, as the volume of the engine sound, a sound volume that is obtained by multiplying together the first sound volume and the second sound volume or a sound volume that is obtained by multiplying together the first sound volume and the further second sound volume. That is, the CPU 35 may use, as the volume of the engine sound, a sound volume that is obtained by multiplying together the first sound volume and one second sound volume. Alternatively, the CPU 35 may use, as the volume of the engine sound, a sound volume that is obtained by multiplying together the first sound volume and three or more second sound volumes.

Figure 8A:
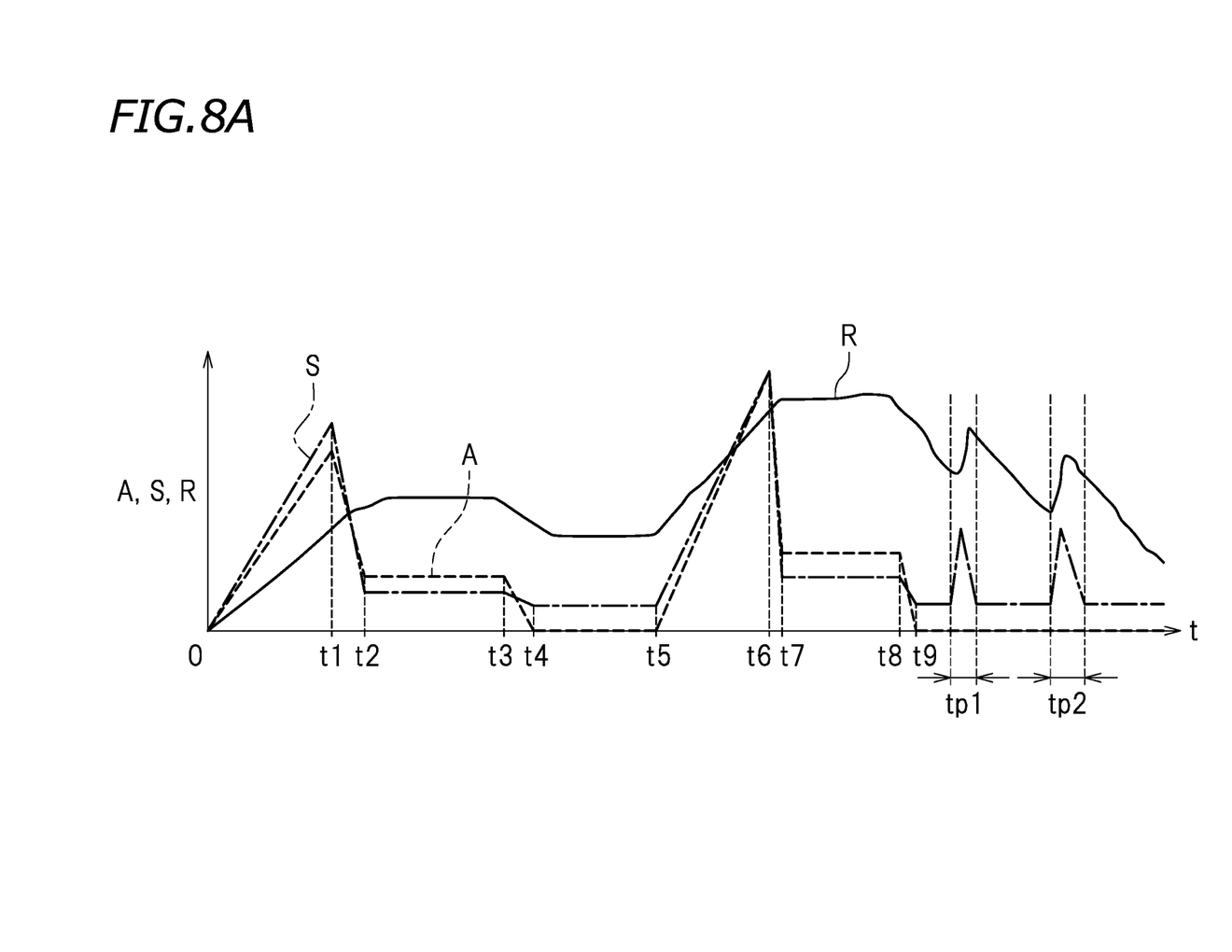
FIG. 8A is a time chart showing a running sequence of the automobile.
Figure 8B:
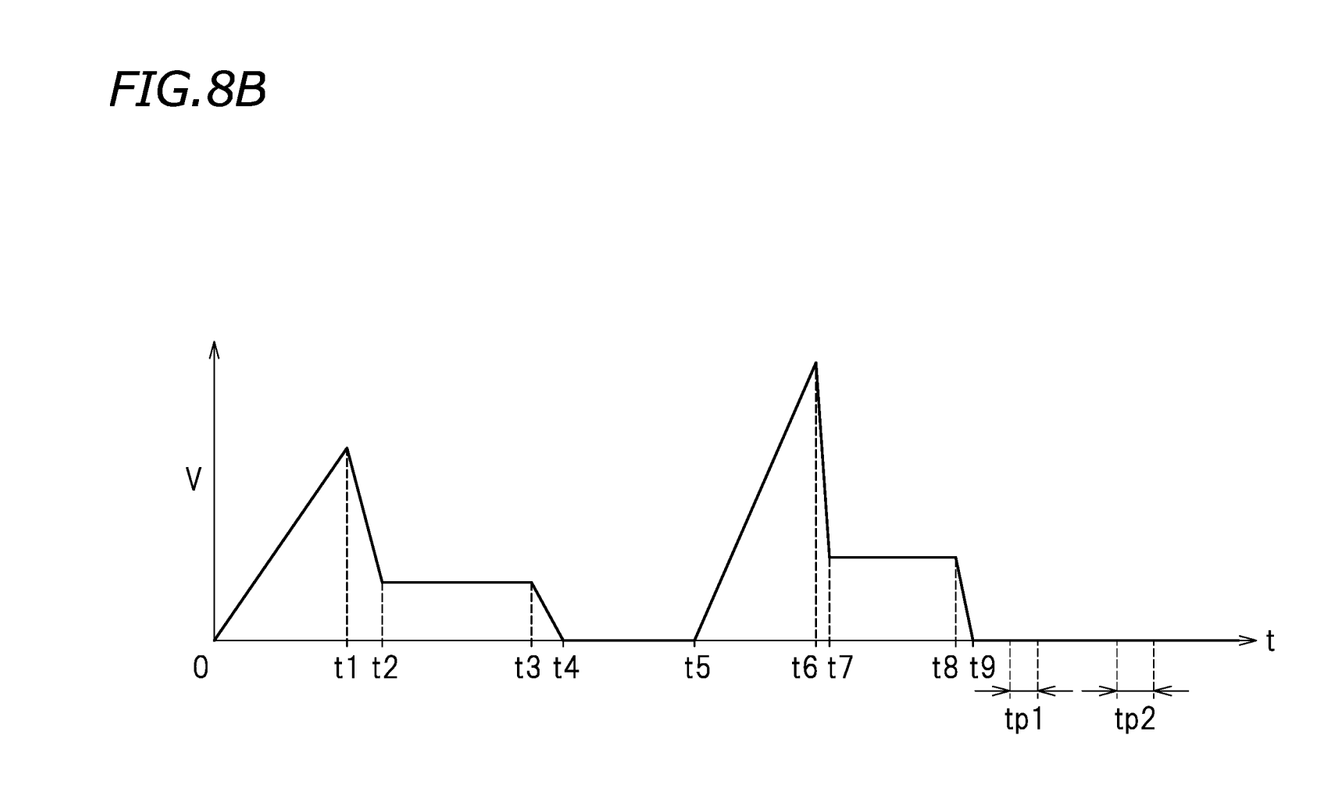
FIG. 8B is a time chart representing the transition of the engine sound with a conventional sound control.
Figure 8C:
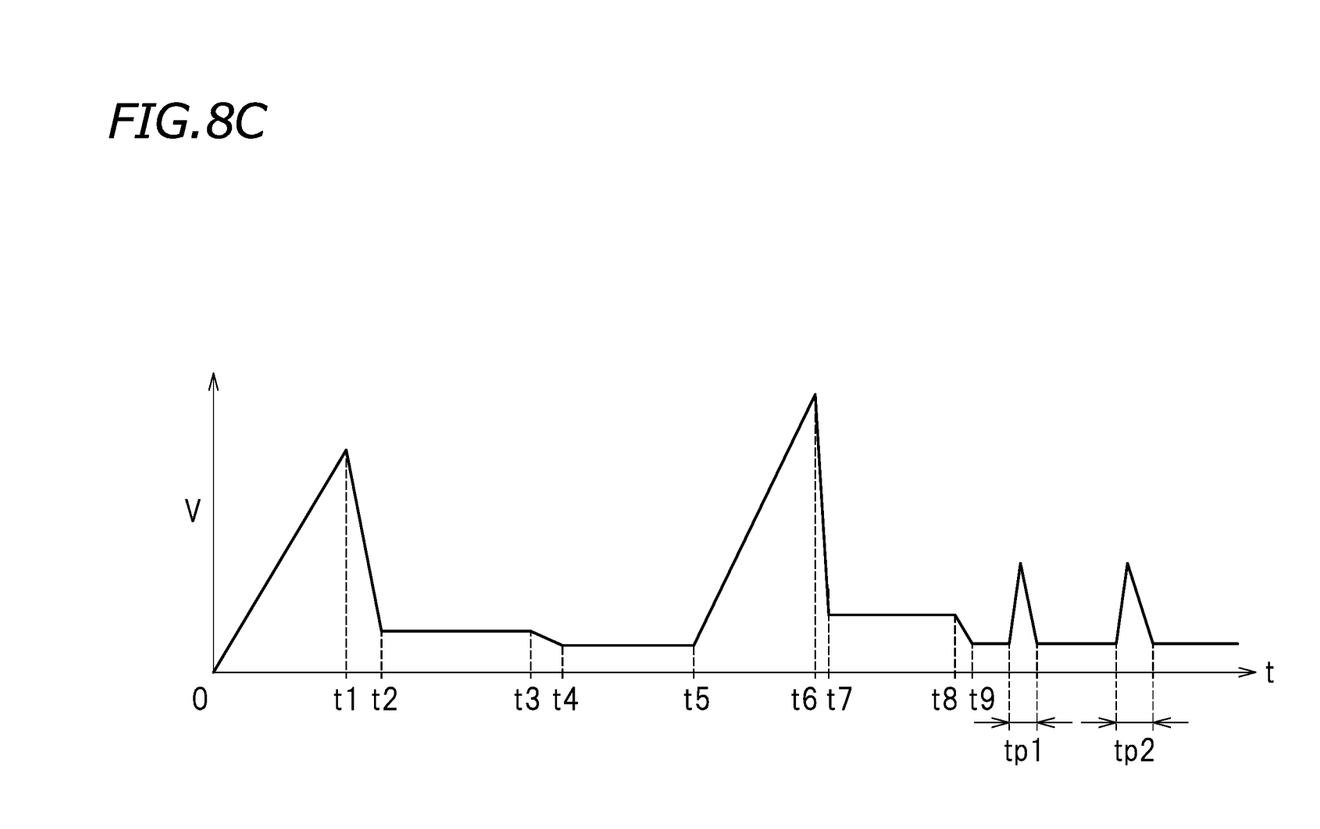
FIG. 8C is a time chart representing the transition of the engine sound with a sound control according to a preferred embodiment of the present invention.

Next, an example of comparison between the sound control according to the present preferred embodiment and the conventional sound control will be described. Note that the conventional sound control as used herein refers to a control by which the sound volume is zero when the amount of accelerator operation is zero. FIG. 8A is a time chart representing an example of a running sequence of the automobile 100. The horizontal axis t of FIG. 8A represents time. The solid line represents the change of the engine speed R, the broken line represents the change of the accelerator opening ratio A, and the one-dot-chain line represents the change of the throttle opening ratio S. FIG. 8B is a graph representing the volume of the engine sound to be output from the speaker 42 based on the conventional sound control when the automobile 100 runs according to the running sequence. FIG. 8C is a graph representing the volume of the engine sound to be output from the speaker 42 based on the sound control of the present preferred embodiment when the automobile 100 runs according to the running sequence.

According to the running sequence, the driver increases the accelerator opening ratio A during 0 to t1, decreases it during t1 to t2, and holds it constant during t2 to t3. Accordingly, the engine controller 10 increases the throttle opening ratio S during 0 to t1, decreases it during t1 to t2, and holds it constant during t2 to t3. As shown in FIGS. 8B and 8C, with either the conventional sound control or the sound control of the present preferred embodiment, the volume V of the engine sound increases during 0 to t1, decreases during t1 to t2, and is held constant during t2 to t3.

Next, the driver decreases the accelerator opening ratio A during t3 to t4 and holds the accelerator opening ratio A at zero during t4 to t5. The engine controller 10 decreases the throttle opening ratio S during t3 to t4, but holds it at a constant value that is greater than zero during t4 to t5. During t4 to t5, the automobile 100 decelerates but does not come to a stop. As shown in FIG. 8B, according to the conventional sound control, the volume V of the engine sound decreases during t3 to t4 and becomes zero during t4 to t5. That is, according to the conventional sound control, during t4 to t5, when the accelerator opening ratio A is zero, no engine sound is output from the speaker 42. As shown in FIG. 8C, according to the sound control of the present preferred embodiment, on the other hand, the volume V of the engine sound decreases during t3 to t4 but is kept at a constant value that is greater than zero during t4 to t5. That is, even during t4 to t5, when the accelerator opening ratio A is zero, an engine sound is output from the speaker 42. Therefore, when the automobile 100 runs while decelerating, the driver is able to hear an engine sound that matches the behavior of the automobile 100, and the driver is therefore unlikely to have a strange feeling.

Thereafter, the driver increases the accelerator opening ratio A during t5 to t6, decreases it during t6 to t7, and holds it constant during t7 to t8. Accordingly, the engine controller 10 increases the throttle opening ratio S during t5 to t6, decreases it during t6 to t7, and holds it constant during t7 to t8. As shown in FIGS. 8B and 8C, with either the conventional sound control or the sound control of the present preferred embodiment, the volume V of the engine sound increases during t5 to t6, decreases during t6 to t7, and is held constant during t7 to t8.

The driver decreases the accelerator opening ratio A during t8 to t9, and the accelerator opening ratio A is zero after t9. The engine controller 10 decreases the throttle opening ratio S during t8 to t9 but does not bring the throttle opening ratio S to zero even at t9. As the engine speed R decreases, the engine controller 10 determines that it is necessary to shift down, and shifts down during periods tp1 and tp2. When shifting down, the engine controller 10 blips. That is, while shifting down, the engine controller 10 performs a control so as to temporarily increase the accelerator opening ratio S.

As shown in FIG. 8B, with the conventional sound control, the volume V of the engine sound decreases during t8 to t9 and becomes zero after t9. However, as shown in FIG. 8C, with the sound control of the present preferred embodiment, the sound volume V decreases during t8 to t9 but does not become zero even after t9. During the periods tp1 and tp2, when a downshift is done, the sound volume V temporarily increases. That is, the sound volume V increases temporarily during a blip. The sound volume V increases in synchronization with the temporary increase in the engine speed R. Therefore, when the automobile 100 blips, the driver hears an engine sound that matches the behaviors of the automobile 100, and the driver is therefore unlikely to have a strange feeling.

As described above, with the automobile 100 according to a preferred embodiment of the present invention, the sound controller 30 sets the volume of the engine sound to a value that is greater than zero even when the amount of accelerator operation is zero in the case of a predetermined vehicle status (e.g., when decelerating, when shifting down). Therefore, in the case of such a vehicle status, an engine sound is output from the speaker 42 even though the amount of accelerator operation is zero. Therefore, the driver hears an engine sound output from the speaker 42, and the driver is able to drive without having a strange feeling. With the automobile 100 having the engine 5 with reduced noise, it is difficult inside the driver cabin 104 to hear a sound of the engine 5. According to the present preferred embodiment, however, the driver hears an engine sound output from the speaker 42, and the driver is able to drive without having a strange feeling.

While there is no particular limitation on the method of setting the volume of the engine sound, the sound controller 30 uses, as the volume of the engine sound, a sound volume that is obtained by multiplying together the first sound volume (see FIG. 5), the second sound volume (see FIG. 6), and the further second sound volume (see FIG. 7) in a preferred embodiment of the present invention. Herein, the first sound volume is a sound volume that is greater than zero when the amount of accelerator operation is zero (see FIG. 5). Therefore, in the case of such a vehicle status described above, an engine sound is output from the speaker 42 even if the amount of accelerator operation is zero.

While preferred embodiments of the present invention have been described above, the preferred embodiments described above are merely examples. Next, other preferred embodiments of the present invention will be described briefly.

Figure 9:
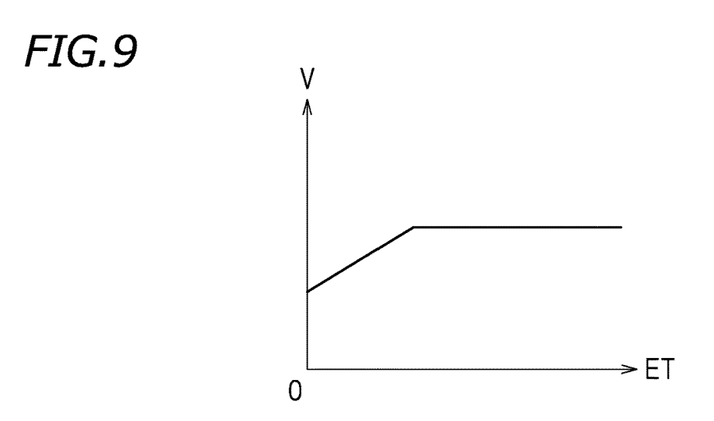
FIG. 9 is a graph showing data of the second sound volume according to another preferred embodiment of the present invention.
Figure 10:
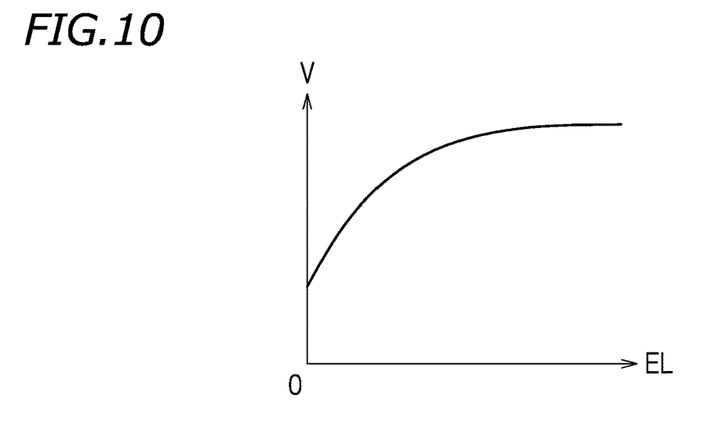
FIG. 10 is a graph showing data of the second sound volume according to another preferred embodiment of the present invention.
Figure 11:
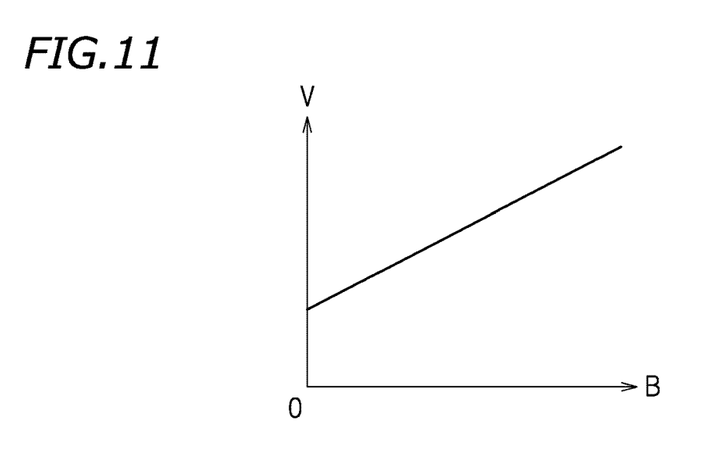
FIG. 11 is a graph showing data of the second sound volume according to another preferred embodiment of the present invention.

According to the preferred embodiments described above, the throttle opening ratio and the engine speed are examples of the vehicle status. However, other examples of the vehicle status may be used. For example, the vehicle status may be the rate of change in the throttle opening ratio, the opening of the throttle valve 23A, or the rate of change in the opening of the throttle valve 23A. The fuel injection amount of the fuel injector 25A may be used. The torque of the engine 5, the load of the engine 5, the rate of change in the load of the engine 5, the running speed of the automobile 100, or the acceleration of the automobile 100 may be used. For example, the torque ET of the engine 5 may be used as the vehicle status, and data shown in FIG. 9 may be used as the data of the second sound volume. Alternatively, the load EL of the engine 5 may be used as the vehicle status, and data shown in FIG. 10 may be used as the data of the second sound volume. The running speed B of the automobile 100 may be used as the vehicle status, and data shown in FIG. 11 may be used as the data of the second sound volume. A single vehicle status may be used alone, or two or more vehicle statuses may be used in combination.

Figure 12:
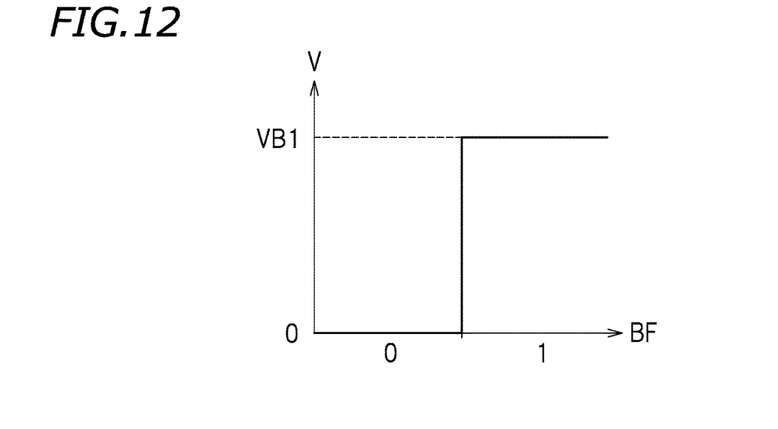
FIG. 12 is a graph showing data of the second sound volume according to another preferred embodiment of the present invention.

The presence/absence of a blip may be used as the vehicle status. For example, the engine controller 10 may use a blip flag that indicates whether or not blipping is used, and set the blip flag from 0 to 1 when blipping is used. When the blip flag is set to 1, the blip signal P6 is transmitted from the engine controller 10 to the sound controller 30 (see FIG. 4). During this process, the CPU 15 of the engine controller 10 functions as a blip signal transmitter that transmits the blip signal P6. FIG. 12 is a graph of sound volume data showing a relationship between the blip flag BF and the sound volume V. Upon receiving the blip signal P6, the CPU 35 of the sound controller 30 may add the volume of the sound volume data shown in FIG. 12 to the volume of the engine sound. Thus, an engine sound of at least the sound volume VB1 is output from the speaker 42 during a blip when the amount of accelerator operation is zero, for example. Therefore, when the automobile 100 blips, the driver is less likely to have a strange feeling. Note that the sound volume data shown in FIG. 12 may be multiplied with a sound volume of another sound volume data.

In the preferred embodiments described above, the automobile 100 is preferably in an automatic transmission mode. The engine controller 10 determines whether or not it is necessary to shift down based at least on engine speed information, and automatically shifts down when it is determined necessary. However, the automobile 100 may shift down in response to an instruction from the driver. The automobile 100 may be in a semi-automatic transmission mode. When a downshift is performed in the semi-automatic transmission mode, the sound controller 30 may set the volume of the engine sound to a value that is greater than zero even if the amount of accelerator operation is zero. For example, when the driver operates the gearshift lever 24A (see FIG. 3) so as to shift down, a signal (hereinafter, referred to as a "downshift signal") is transmitted from the gearshift sensor 24. Upon receiving a downshift signal and detecting a downshift, the CPU 35 of the sound controller 30 temporarily increases the volume of the engine sound to be output from the speaker 42 even if the amount of operation of the acceleration pedal 6 detected by the accelerator sensor 7 is zero. Thus, even in a semi-automatic transmission mode, the driver is able to drive without having a strange feeling.

When the running speed of the automobile 100 detected by the vehicle speed sensor 22 is greater than zero and is decreasing, the CPU 35 of the sound controller 30 may set the volume of the engine sound to a value that is greater than zero even if the amount of operation of the acceleration pedal 6 detected by the accelerator sensor 7 is zero. Thus, it is possible to prevent the volume of the engine sound output from the speaker 42 from becoming zero while the automobile 100 is decelerating. Therefore, the driver is less likely to have a strange feeling when the automobile 100 is running while decelerating.

Figure 13:
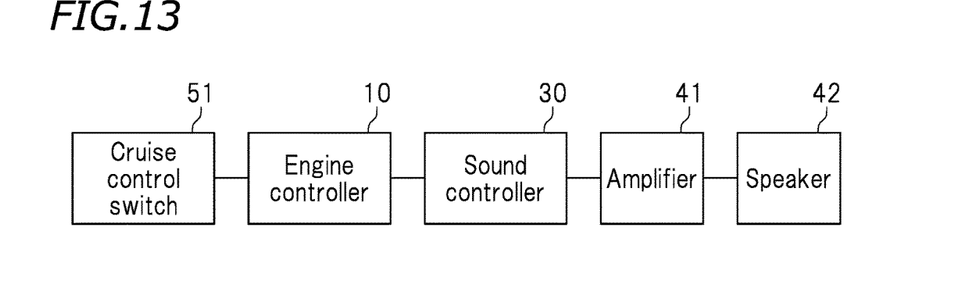
FIG. 13 is a block diagram showing a control system that performs a sound control according to another preferred embodiment of the present invention.

The engine controller 10 of the automobile 100 may include a cruise control mode in which the automobile 100 runs without the driver operating the acceleration pedal 6. As shown in FIG. 13, the automobile 100 may include a cruise control switch 51 used to turn ON/OFF the cruise control mode. When the cruise control switch 51 is turned ON, the cruise control switch 51 transmits a signal (hereinafter, referred to as a "cruise control signal") that instructs a cruise control mode of the engine 5. Upon receiving a cruise control signal, the engine controller 10 performs a cruise control and transmits a cruise control signal to the sound controller 30. While cruise control is being performed, the driver does not operate the acceleration pedal 6. The amount of accelerator operation is zero. Upon receiving a cruise control signal, the CPU 35 of the sound controller 30 sets the volume of the engine sound to be output from the speaker 42 to a value that is greater than zero even if the amount of accelerator operation detected by the accelerator sensor 7 is zero. For example, the CPU 35 sets the volume of the engine sound to be output from the speaker 42 to a sound volume that matches the engine speed R.

The driver tends to have a strange feeling when the engine sound volume becomes zero while the vehicle is running, but the driver may not have a strange feeling when the engine sound volume becomes zero while the engine is idling when the vehicle is not moving. Therefore, the CPU 35 of the sound controller 30 may set the volume of the engine sound to be output from the speaker 42 to zero when the engine speed detected by the engine speed sensor 21 is greater than zero, the amount of operation of the acceleration pedal 6 detected by the accelerator sensor 7 is zero, and the running speed detected by the vehicle speed sensor 22 is zero. That is, while these conditions are met, the CPU 35 may output no engine sound from the speaker 42. Then, the CPU 35 functions as a no-sound controller of the sound controller 30.

The engine 5 of the preferred embodiments described above is preferably a gasoline engine including the throttle valve 23A. However, the engine 5 may be a diesel engine that does not include the throttle valve 23A.

In the preferred embodiments described above, the vehicle is preferably the passenger automobile 100. However, the vehicle is not limited to a passenger automobile but may be a freight automobile. It may be any other type of an automobile. It may be a vehicle other than an automobile, e.g., a motorcycle or a motorized tricycle. The vehicle is not limited to including a driver cabin that is partitioned by doors and windows. The speaker is not limited to being located in a closed driver cabin.

The accelerator refers to an element that is used to control the output of the engine, but it is not limited to an acceleration pedal and may be an accelerator grip, or the like.

Sound volume data of an engine sound is not limited to data that is able to be represented by a graph. Sound volume data may be data that is managed as a map, for example.

The method of combining the first sound volume and the second sound volume is not limited to multiplication. The first sound volume and the second sound volume may be added together. Alternatively, the first sound volume and one or more second sound volume may be added together, and the first sound volume and another one or more second sound volumes may be multiplied together. Other combinations between the first sound volume and one or more second sound volumes may be selected as appropriate.

The terms and expressions used herein are used for explanation purposes and should not be construed as being restrictive. It should be appreciated that the terms and expressions used herein do not eliminate any equivalents of features illustrated and mentioned herein, but include various modifications falling within the claimed scope of the present invention. The present invention may be embodied in many different forms. The present disclosure is to be considered as providing examples of the principles of the present invention. These examples are described herein with the understanding that such examples are not intended to limit the present invention to preferred embodiments described herein and/or illustrated herein. Hence, the present invention is not limited to the preferred embodiments described herein. The present invention includes any and all preferred embodiments including equivalent elements, modifications, omissions, combinations, adaptations and/or alterations as would be appreciated by those skilled in the art on the basis of the present disclosure. The limitations in the claims are to be interpreted broadly based on the language included in the claims and not limited to examples described in the present specification or during the prosecution of the application.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vehicle comprising:
an internal combustion engine;
a driving wheel that is linked to the internal combustion engine;
an accelerator that is operated by a driver;
an accelerator sensor that detects an amount of operation of the accelerator;
a vehicle status sensor that detects a vehicle status;
an engine controller that is connected to the accelerator sensor and the vehicle status sensor and is configured or programmed to control the internal combustion engine based on a signal from the accelerator sensor and a signal from the vehicle status sensor;
a sound controller that is connected to the accelerator sensor and the vehicle status sensor, or is connected at least to the engine controller, and is configured or programmed to generate an engine sound based on the amount of operation of the accelerator detected by the accelerator sensor and the vehicle status detected by the vehicle status sensor; and
a speaker that is communicably connected to the sound controller and outputs the engine sound; wherein
the sound controller includes an engine sound controller that is configured or programmed to set a volume of the engine sound to a value that is greater than zero when the amount of operation of the accelerator detected by the accelerator sensor is zero and the vehicle status detected by the vehicle status sensor is a predetermined status.

2. The vehicle according to claim 1, wherein
the sound controller includes a storage that stores data of a first sound volume that is determined in accordance with the amount of operation of the accelerator detected by the accelerator sensor, and data of a second sound volume that is determined in accordance with the vehicle status detected by the vehicle status sensor;
the first sound volume is set to a sound volume that is greater than zero when the amount of operation of the accelerator detected by the accelerator sensor is zero; and
the engine sound controller uses, as the volume of the engine sound, a sound volume that is obtained by multiplying at least the first sound volume and the second sound volume.

3. The vehicle according to claim 1, wherein
the internal combustion engine includes a throttle valve; and
the vehicle status detected by the vehicle status sensor is at least one of an opening of the throttle valve, an opening ratio of the throttle valve, a rate of change in the opening of the throttle valve, a rate of change in the opening ratio of the throttle valve, a rotation speed of the internal combustion engine, a torque of the internal combustion engine, a load of the internal combustion engine, a rate of change in the load of the internal combustion engine, a speed of the vehicle, and an acceleration of the vehicle.

4. The vehicle according to claim 1, wherein
the internal combustion engine includes a fuel injector; and
the vehicle status detected by the vehicle status sensor is at least one of a fuel injection amount of the fuel injector, a rotation speed of the internal combustion engine, a torque of the internal combustion engine, a load of the internal combustion engine, a rate of change in the load of the internal combustion engine, a speed of the vehicle, and an acceleration of the vehicle.

5. The vehicle according to claim 1, wherein
the engine controller includes a blip signal transmitter that transmits a blip signal indicating that blipping is used; and
when the blip signal is received from the blip signal transmitter, the engine sound controller temporarily increases the volume of the engine sound even if the amount of operation of the accelerator detected by the accelerator sensor is zero.

6. The vehicle according to claim 1, further comprising:
a shift operator that is operated by the driver; and
a gearshift sensor that detects a position of the shift operator; wherein
upon receiving a signal from the gearshift sensor and detecting a downshift, the engine sound controller temporarily increases the volume of the engine sound even if the amount of operation of the accelerator detected by the accelerator sensor is zero.

7. The vehicle according to claim 1, wherein
the vehicle status detected by the vehicle status sensor is a speed of the vehicle; and
when the speed detected by the vehicle status sensor is greater than zero and is decreasing, the engine sound controller is configured or programmed to set the volume of the engine sound to a value that is greater than zero even if the amount of operation of the accelerator detected by the accelerator sensor is zero.

8. The vehicle according to claim 1, further comprising:
a cruise control switch that is operated by the driver and transmits a cruise control signal that instructs a cruise control mode of the internal combustion engine; wherein
upon receiving the cruise control signal from the cruise control switch, the engine sound controller is configured or programmed to set the volume of the engine sound to a value that is greater than zero even if the amount of operation of the accelerator detected by the accelerator sensor is zero.

9. The vehicle according to claim 1, wherein
the vehicle status detected by the vehicle status sensor is a speed of the vehicle; and
the sound controller includes a no-sound controller that is configured or programmed to set the volume of the engine sound to zero when the internal combustion engine is in operation, the amount of operation of the accelerator detected by the accelerator sensor is zero, and the speed detected by the vehicle status sensor is zero.

* * * * *